(12) United States Patent
Schlesinger et al.

(10) Patent No.: US 11,465,692 B2
(45) Date of Patent: Oct. 11, 2022

(54) CENTRAL CONNECTOR FOR VEHICLES HAVING A HIGH-VOLTAGE ACCUMULATOR

(71) Applicant: Bayerische Motoren Werke Aktiengesellschaft, Munich (DE)

(72) Inventors: Benjamin Schlesinger, Garching (DE); Martin Spaeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 103 days.

(21) Appl. No.: 17/048,528

(22) PCT Filed: Apr. 12, 2019

(86) PCT No.: PCT/EP2019/059381
§ 371 (c)(1),
(2) Date: Oct. 16, 2020

(87) PCT Pub. No.: WO2019/211079
PCT Pub. Date: Nov. 7, 2019

(65) Prior Publication Data
US 2021/0163076 A1   Jun. 3, 2021

(30) Foreign Application Priority Data
May 3, 2018   (DE) ..................... 10 2018 206 837.2

(51) Int. Cl.
*B60K 1/04*   (2019.01)
*B62D 27/04*   (2006.01)

(52) U.S. Cl.
CPC ................ *B62D 27/04* (2013.01); *B60K 1/04* (2013.01); *B60K 2001/0438* (2013.01)

(58) Field of Classification Search
CPC ... B62D 27/04; B60K 1/04; B60K 2001/0438
See application file for complete search history.

(56) References Cited

U.S. PATENT DOCUMENTS 9,884,545 B1   2/2018   Addanki et al.
11,034,248 B2 *   6/2021   Ohkuma ................. B60L 50/66
(Continued)

FOREIGN PATENT DOCUMENTS

CN         102320234 B       8/2013
DE   10 2011 083 889 A1     4/2013
(Continued)

OTHER PUBLICATIONS

International Search Report (PCT/ISA/210) issued in PCT Application No. PCT/EP2019/059371 dated Aug. 19, 2019 with English translation (six pages).
(Continued)

*Primary Examiner* — James A English
*Assistant Examiner* — James J Triggs
(74) *Attorney, Agent, or Firm* — Crowell & Moring LLP

(57) ABSTRACT

A vehicle has a body, a high-voltage accumulator that is mounted on the body by fastening elements, and at least one central connector which differs from the fastening elements and is designed to support the body on the high-voltage accumulator. The central connector is in the form of a rubber bearing having a vibration-absorbing rubber element that extends between the body and the high-voltage accumulator.

15 Claims, 2 Drawing Sheets

(56) References Cited

U.S. PATENT DOCUMENTS

| | | |
|---|---|---|
| 2012/0040219 A1 | 2/2012 | Cappellotti et al. |
| 2012/0292837 A1 | 11/2012 | Hettler et al. |
| 2014/0001685 A1 | 1/2014 | Kim et al. |
| 2014/0326524 A1* | 11/2014 | Ogushi .................... B60K 1/04 180/68.5 |
| 2016/0327116 A1 | 11/2016 | Kim |
| 2017/0066313 A1 | 3/2017 | Shirai et al. |
| 2017/0210218 A1 | 7/2017 | Schmalzrieth et al. |
| 2018/0051769 A1 | 2/2018 | Kim |
| 2018/0162212 A1 | 6/2018 | Kim |
| 2018/0238413 A1 | 8/2018 | Brown et al. |
| 2018/0320753 A1 | 11/2018 | Beckmann et al. |
| 2019/0128363 A1 | 5/2019 | Kim et al. |
| 2019/0207181 A1 | 7/2019 | Raepple |
| 2020/0009957 A1 | 1/2020 | Grosse et al. |
| 2020/0182328 A1 | 6/2020 | Luenebach et al. |
| 2021/0095737 A1 | 4/2021 | Oblizajek et al. |
| 2021/0163076 A1 | 6/2021 | Schlesinger et al. |
| 2021/0206252 A1 | 7/2021 | Ben Salah et al. |
| 2021/0370755 A1 | 12/2021 | Schlesinger et al. |
| 2022/0016965 A1 | 1/2022 | Schlesinger et al. |

FOREIGN PATENT DOCUMENTS

| | | |
|---|---|---|
| DE | 10 2012 200 350 A1 | 7/2013 |
| DE | 10 2016 000 669 B3 | 1/2017 |
| DE | 10 2016 113 877 A1 | 3/2017 |
| DE | 10 2016 206 177 A1 | 10/2017 |
| DE | 10 2016 219 242 A1 | 4/2018 |
| JP | 2002-235801 A | 8/2002 |
| JP | 2010-111302 A | 5/2010 |
| WO | WO 2007/065761 A1 | 6/2007 |

OTHER PUBLICATIONS

German-language Written Opinion (PCT/ISA/237) issued in PCT Application No. PCT/EP2019/059371 dated Aug. 19, 2019 (five pages).

German-language Search Report issued in German Application No. 10 2018 206 836.4 dated Feb. 5, 2019 with partial English translation (12 pages).

International Search Report (PCT/ISA/210) issued in PCT Application No. PCT/EP2019/059381 dated Jul. 25, 2019 with English translation (six pages).

German-language Written Opinion (PCT/ISA/237) issued in PCT Application No. PCT/EP2019/059381 dated Jul. 25, 2019 (six pages).

German-language Search Report issued in German Application No. 10 2018 206 837.2 dated Feb. 5, 2019 with partial English translation (12 pages).

United States Non-Final Office Action issued in U.S. Appl. No. 17/048,520 dated Aug. 17, 2022 (10 pages).

English translation of document B1 (DE 10 2016 206 177 A1 filed on Oct. 16, 2020) (four (4) pages).

* cited by examiner

CENTRAL CONNECTOR FOR VEHICLES HAVING A HIGH-VOLTAGE ACCUMULATOR

BACKGROUND AND SUMMARY OF THE INVENTION

The present invention relates to a vehicle in which a high-voltage accumulator is connected to the body in an optimal manner by way of a central connector.

Electric vehicles or plug-in hybrids are known from the prior art. Such vehicles require a high-voltage accumulator for accumulating energy which can be provided for driving the vehicle. Such high-voltage accumulators are in most instances disposed in the region of the underbody of the vehicle. Since high-voltage accumulators are typically a voluminous contiguous element, a corresponding cutout from the body is required.

In order for the high-voltage accumulator to be fastened to the body, the peripheral regions of the high-voltage accumulator are in particular fixedly screwed or riveted to the body. Moreover, a central connection between the high-voltage accumulator and the body is established. On account thereof, the body in the direction of a vertical axis of the vehicle can be supported on an external wall of the high-voltage accumulator. Various connection techniques, for example screw-fitting, bracing, or adhesive bonding are known for these central connections.

A relative movement between the body and the high-voltage accumulator typically has to be taken into account at the position of the central connector. This movement has to be absorbed or dampened by the body and the lateral wall of the high-voltage accumulator.

It is an object of the invention to provide a vehicle having a high-voltage accumulator, the vehicle while providing a simple and cost-effective construction and assembly enabling a secure and reliable linking of the high-voltage accumulator to a body of the vehicle.

The object is achieved by the features of the independent claims. The dependent claims include preferred refinements of the invention.

The object is thus achieved by a vehicle which comprises a body and a high-voltage accumulator. The high-voltage accumulator is attached to the body by way of fastening elements. The high-voltage accumulator is in particular connected to the body by way of the fastening elements in peripheral regions. The fastening elements comprise in particular screws and/or rivets for fastening the high-voltage accumulator to the body. Fixed linking of the high-voltage accumulator to the body thus takes place in particular by way of the fastening elements. Additionally, at least one central connector which differs from the fastening elements is provided. The central connector is configured for supporting the body on the high-voltage accumulator. The supporting action takes place in particular in a manner parallel to a vertical axis of the vehicle. It is thus provided that a reinforcement of the body is achieved by connecting the body and an external wall of the high-voltage accumulator. The central connector is in particular a rubber mount having a vibration-absorbing rubber element which extends between the body and the high-voltage accumulator. The rubber mount, in particular the vibration-absorbing rubber element, particularly advantageously extends from an upper side of the high-voltage accumulator to a lower side of the body. A compensation of tolerances between the high-voltage accumulator and the body, on the one hand, and damping of relative movements between the high-voltage accumulator and the body, on the other hand, is enabled on account of the use of a rubber mount. The damping of movements takes place in particular along the axis along which the rubber mount extends between the high-voltage accumulator and the body. This axis is in particular parallel to the vertical axis of the vehicle. The damping takes place in particular by way of the rubber element which converts the energy of the relative movement to deformation work of the rubber element. Stresses which are to be absorbed by the high-voltage accumulator are reduced on account of the damping of relative movements. A reinforcement of the body can be thus be achieved, on the one hand, and excessive stress on the high-voltage accumulator is prevented, on the other hand.

It is advantageously provided that the central connector is disposed on a largest external face of the high-voltage accumulator. The central connector is particular disposed so as to be centric on a largest external face of the high-voltage accumulator. If a plurality of external faces of the high-voltage accumulator are of identical size and larger than the other external faces, it is thus provided in particular that the central connector is disposed on one of the largest external faces. The high-voltage accumulator is preferably configured so as to be cuboid. The high-voltage accumulator thus has two largest external faces, wherein these largest external faces are oriented in particular so as to be perpendicular to the vertical axis of the vehicle. The central connector is attached to an upper one of these external faces and thus connects the high-voltage accumulator to the body.

The rubber element is preferably fixedly connected to a base plate. The rubber element, and thus the rubber mount, is fixedly connected to the high-voltage accumulator by way of the base plate. The rubber element can preferably be connected to the base plate in a form-fitting and/or materially integral and/or force-fitting manner. It is in particular provided that the rubber element is connectable to the body while the base plate is fixedly connected to the high-voltage accumulator. A compensation of tolerances advantageously takes place by way of the connection between the rubber element and the body such that a compensation of tolerances does not have to be performed on the base plate. Rather, the base plate can be linked to the high-voltage accumulator in a manner that is simple and of low complexity.

The base plate is particularly advantageously fixedly connected to an external wall of the high-voltage accumulator. The base plate can in particular be fixedly connected to the external wall, for example screwed or riveted to the latter. The base plate can also be connected to the external wall in a form-fitting manner, for example be welded or adhesively bonded to the latter. In an alternative embodiment, the base plate is part of the external wall of the high-voltage accumulator. This means that the external wall and the base plate are configured in an integral manner. The sub-structure is thus preferably attached directly to the external wall of the high-voltage accumulator. In any case, it is rendered possible in a manner that is simple and of low complexity that the central connector is initially provided on the high-voltage accumulator and for the central connector is fastened to the body in a subsequent assembly step. The fastening to the body advantageously enables a compensation of tolerances. The central connector can thus be attached in a manner that is simple and of low complexity and can enable the relative movements between the high-voltage accumulator and the body to be dampened in a secure and reliable manner.

The rubber element is preferably enclosed by a threaded ring. The threaded ring engages with a compensation case.

It is provided that the threaded ring and the compensation case enable a compensation of tolerances between the high-voltage accumulator and the body. A spacing of the compensation case from the base plate can thus be in particular varied by screwing the compensation case into the threaded ring or unscrewing the compensation case from the threaded ring. A dimension of the rubber mount can thus be adjusted by screwing-in or unscrewing the compensation case. The rubber mount is in particular adjustable in such a manner that the afore-described base plate bears on the high-voltage accumulator and the compensation case bears on the body.

The rubber element advantageously has an internal-thread element. The internal-thread element serves for linking the rubber mount to the body. To this end, a screw element for connecting the body and the rubber mount is able to be screwed into the internal-thread element. It is furthermore provided that the screw element engages through an opening of the compensation case. The screw element can in particular be a screw. The rubber element, and thus the rubber mount, is able to be fixedly connected to the body by screwing the screw into the internal-thread element of the rubber element. On account thereof it is preferably provided that the rubber element by way of the screw element is connected to the body on the one hand, and by way of the base plate is connected to the high-voltage accumulator, on the other hand. This leads to relative movements between the high-voltage accumulator and the body being dampened by the rubber element. The internal-thread element can in particular be a threaded sleeve which is provided on the rubber element, in particular is press-fitted into the rubber element.

The opening of the compensation case preferably has a circlip. The circlip bears on the screw element once the screw element has been guided through the opening. There is thus a connection present between the screw element and the compensation case. The compensation case can therefore be rotated conjointly with the screw element. Since the connection takes place in a force-fitting manner by way of the circlip, a maximum torque which is able to be transmitted between the compensation case and the screw element is limited. It is thus furthermore rendered possible for the screw element to be rotated in the case of a stationary compensation case, and vice versa. Handling of the compensation case is thus simplified.

The threaded ring and the internal-thread element particularly advantageously have opposite rotating directions. This means that the threaded ring preferably has a left-handed thread and the internal-thread element preferably has a right-handed thread, or vice versa. When the screw element is screwed into the internal-thread element, a rotation of the compensation case first takes place since the screw element, prior to reaching the internal-thread element, has to engage through the opening of the compensation case and there is connected in a force-fitting manner to the compensation case by the circlip. A transmission of torque therefore takes place, wherein the compensation case is unscrewed from the threaded ring when a technician intends to screw the screw element into the internal-thread element. This unscrewing takes place in particular until the compensation case bears on the body. A further rotation of the compensation case is not possible in such a state such that the screw element can be screwed further through the opening toward the internal-thread element. Fixing of the screw element takes place there such that a fixed connection is present between the body and the high-voltage accumulator, wherein a compensation of tolerances is likewise performed.

A dimension of the rubber mount along a vertical axis of the vehicle is preferably at most 50.0 millimeters. The dimension particularly advantageously is at most 28.5 millimeters, in particular at most 21.5 millimeters. It is moreover advantageously provided that a dimension of the rubber mount in a plane perpendicular to the vertical axis of the vehicle is at most 120 millimeters, preferably at most 50 millimeters, in particular at most 40 millimeters. The rubber mount can thus be attached in a manner that saves installation space. At the same time, a secure and reliable damping of relative movements of the high-voltage accumulator and the body is enabled so as to achieve that the body is supported on the high-voltage accumulator in a manner that is reliable and low in force.

Further details, features, and advantages of the invention are derived from the description hereunder and from the figures.

DETAILED DESCRIPTION OF THE DRAWINGS

Figure 1:
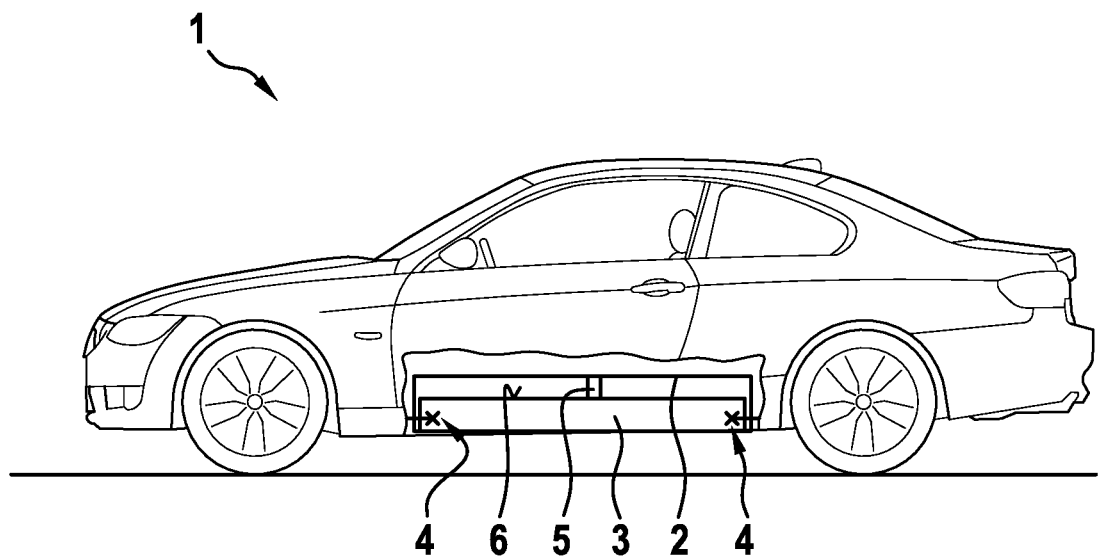
FIG. 1 shows a schematic view of a vehicle according to an exemplary embodiment of the invention.

FIG. 1 schematically shows a vehicle 1 according to an exemplary embodiment of the invention. The vehicle 1 is in particular an electric vehicle or a plug-in hybrid. Vehicle 1 is thus configured for providing electric energy.

The vehicle 1 comprises a body 2 and a high-voltage accumulator 3. The high-voltage accumulator 3 in the peripheral region is fastened to the body 2 by way of fastening elements 4 and is thus fixedly connected to the body 2. The body 2 herein has a cutout in which the high-voltage accumulator 3 is attached. The body is potentially weakened by such a cutout such that support by way of a central connector 5 is advantageous.

The high-voltage accumulator 3 is substantially cuboid. It is provided herein that the largest external faces 6 of the high-voltage accumulator 3 are oriented so as to be perpendicular to a central axis of the vehicle 1. A largest external face 6 is in particular present on an upper side of the high-voltage accumulator 3. The central connector 5 connects the body 2 to this external face 6 of the high-voltage accumulator 3 and thus permits the body 2 to be supported on the high-voltage accumulator 3. The central connector 5 is in particular disposed so as to be centric on the external face 6.

Figure 2:
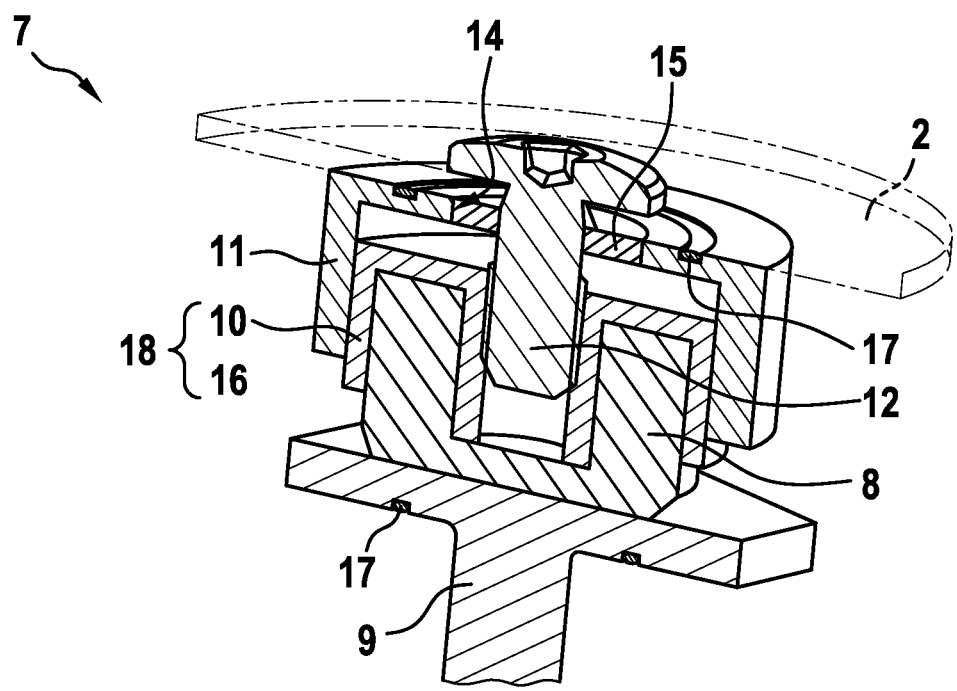
FIG. 2 shows a schematic view of the design of the central connector of the vehicle according to the exemplary embodiment of the invention.
Figure 3:
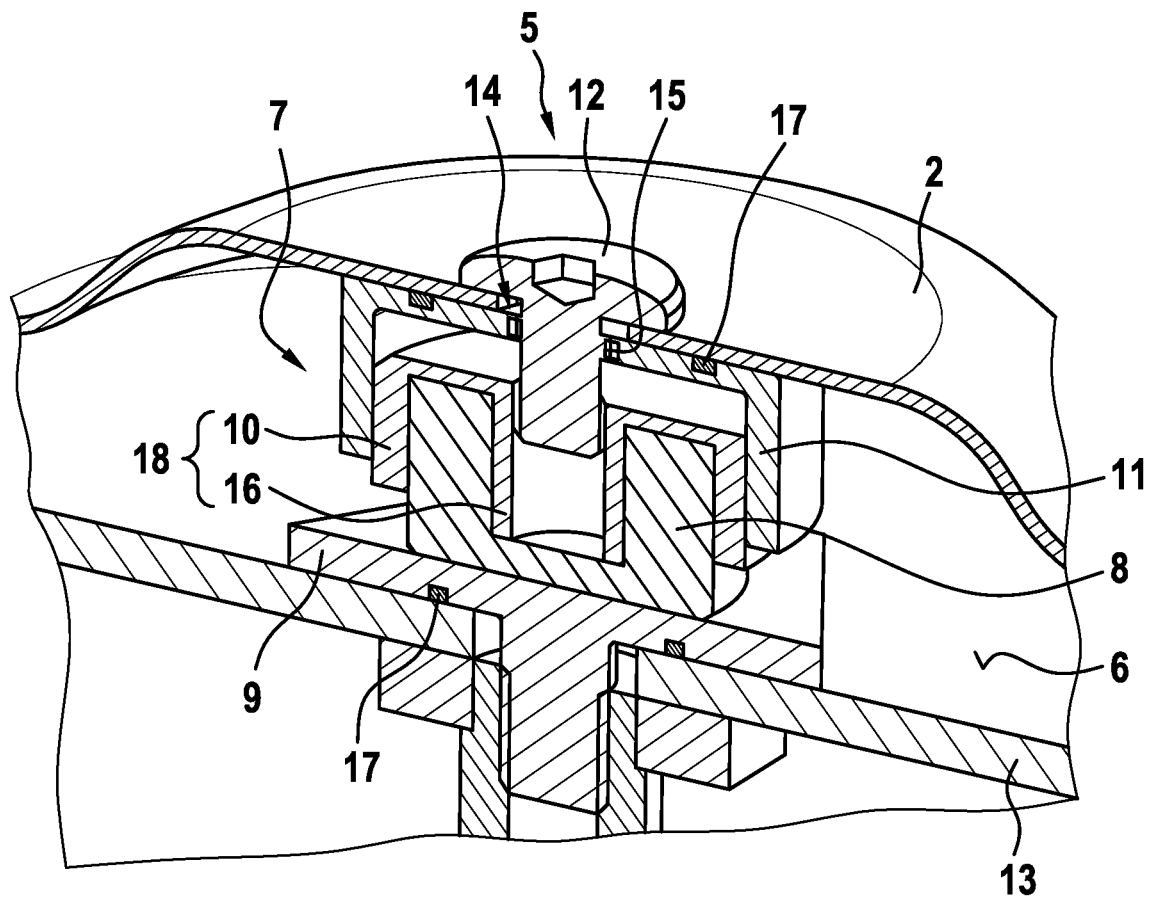
FIG. 3 shows a schematic view of linking the high-voltage accumulator to the body of the vehicle according to the exemplary embodiment of the invention.

FIG. 2 schematically shows the central connector 5 configured as a rubber mount 7. FIG. 3 shows a schematic view of the central connector 5 in the installed state between the high-voltage accumulator 3 and the body 2. FIGS. 2 and 3 are therefore conjointly described hereunder.

The rubber mount 7 has a rubber element 8 which is configured for receiving and absorbing relative movements between the body 2 and the base plate 9. The rubber element 8 can be produced from natural or synthetic rubber. It is provided that the rubber element 8 is fixedly connected to a base plate 9. The rubber element 8 is in particular adhesively bonded to the base plate 9.

The rubber element 8, and thus the rubber mount 7, is linked to the high-voltage accumulator 3 by way of the base plate 9. The base plate 9 is attached to an external wall 13 of the high-voltage accumulator 3 that forms the external face 6. For example, the base plate 9 can be screwed, riveted, or adhesively bonded to the external wall 13. Alternatively, the external wall 13 can be configured so as to be integral to the base plate 9 such that the rubber element 8 is fastened directly to the high-voltage accumulator 3.

The rubber element 8 furthermore has an internal-thread element 16. The internal-thread element 16 serves for fastening the rubber element 8 to the body 2. The internal-thread element 16 is advantageously an insert of a metal or a plastics material which is inserted into the rubber element 8 so as to be centric therein. The internal-thread element 16 and the threaded ring 10 in the exemplary embodiment shown are part of a threaded member 18. This design embodiment simplifies the production of the central connector 5. Should a relative movement take place between the body 2 and the high-voltage accumulator 3, the rubber element 8 is thus deformed, the relative movement being dampened on account thereof. Since a connection between the high-voltage accumulator 3 and the body 2 exists by way of the rubber element 8, it is possible for the body 2 to be supported on the high-voltage accumulator 3 by way of the rubber mount 7.

In order for the rubber mount 7 to be linked to the body 2, a compensation of tolerances is preferably to be provided. A spacing between the high-voltage accumulator 3 and the body 2 is in particular to be compensated herein. To this end, the rubber mount 7 has a threaded ring 10 onto which a compensation case 11 is screwed.

The threaded ring 10 is advantageously made from a metal or a plastics material and surrounds the rubber element 8 in an annular manner. The compensation case 11 is thus likewise provided for enclosing the rubber element 8 in an annular manner. When the compensation case 11 is unscrewed from the threaded ring 10 or screwed into the threaded ring 10, a spacing between the base plate 9 and the compensation case 11 is thus varied. This leads to a variation of a dimension of the rubber mount 7 such that the rubber mount 7 can be adapted to a spacing between the body 2 and the high-voltage accumulator 3.

The compensation case 11 has an opening 14 through which a screw element 12 is guided. The screw element 12 serves for connecting the body 2 to the internal-thread element 16 of the rubber mount 7. In order to guarantee simple handling of the rubber mount 7 during assembly it is provided that the compensation case 11 is also able to be activated by way of the screw element 12.

In order for this simple handling capability to be achieved, the compensation case 11 has a spring element 15 in the opening 14 such that the compensation case 11 and the screw element 12 are connected in a force-fitting manner. The threaded ring 10 and the internal-thread element 16 furthermore have threads of dissimilar rotation. For example, the internal-thread element 16 has a right-handed thread, and the threaded ring 10 has a left-handed thread. When the body 2 is to be connected to the rubber mount 7 by way of the screw element 12, the following assembly steps are thus required.

First, the screw element 12 is guided through an opening of the body 2 and through the opening 14 of the compensation case 11. The screw element 12 is then connected to the compensation case 11 in a force-fitting manner. When the screw element 12 is rotated in the screwing-in direction thereof, a screwing of the compensation case 11 from the threaded ring 10 first takes place. This takes place until the compensation case 11 bears on the body 2, which means that a compensation of tolerances has been performed. The compensation case 11 can subsequently not be moved any further such that the screw element 12 is rotated in relation to the compensation case 11 until the screw element 12 is fixedly connected to the internal-thread element 16. On account thereof, the body 2 is linked to the rubber mount 7.

The screw element 12 has thus only to be rotated in the screwing-in direction in order to perform a compensation of tolerances as well as a connection between the body 2 and the high-voltage accumulator 3. The handling of the rubber mount 7 is thus simplified.

The rubber mount 7 moreover has in each case one seal 17 on the base plate 9 and on the compensation case 11. The rubber mount 7 can thus be sealed in relation to the body 2 and in relation to the high-voltage accumulator 3.

A dimension of the rubber mount 7 along a vertical axis of the vehicle 1 is preferably at most 50.0 millimeters or at most 28.5 millimeters or at most 21.5 millimeters. Moreover, a dimension of the rubber mount 7 in a plane perpendicular to the vertical axis of the vehicle 1 is at most 120 millimeters or at most 50 millimeters or at most 40 millimeters. The rubber mount 7 can thus be attached in a manner that saves installation space. At the same time, a secure and reliable damping of relative movements between the high-voltage accumulator 3 and the body 2 is enabled so as to achieve that the body 2 is supported on the high-voltage accumulator 3 in a manner that is reliable and low in force.

LIST OF REFERENCE SIGNS

1 Vehicle
2 Body
3 High-voltage accumulator
4 Fastening element
5 Central connector
6 External face
7 Rubber mount
8 Rubber element
9 Base plate
10 Threaded ring
11 Compensation case
12 Screw element
13 External wall
14 Opening
15 Circlip
16 Internal-thread element
17 Seal
18 Threaded member

What is claimed is:
1. A vehicle, comprising:
a body;
a high-voltage accumulator which is attached to the body by way of fastening elements; and
at least one central connector which differs from the fastening elements and which, for supporting the body, is configured on the high-voltage accumulator,
wherein the central connector is a rubber mount having a vibration-absorbing rubber element which extends between the body and the high-voltage accumulator, wherein
the rubber element is fixedly connected to a base plate, and
the rubber mount is fixedly connected to the high-voltage accumulator by way of the base plate.

2. The vehicle according to claim 1, wherein the central connector is disposed on a largest external face of the high-voltage accumulator.

3. The vehicle according to claim 1, wherein the central connector is disposed centrally on a largest external face of the high-voltage accumulator.

4. The vehicle according to claim 1, wherein the base plate is fixedly connected to an external wall of the high-voltage accumulator, or is part of the external wall of the high-voltage accumulator.

5. The vehicle according to claim 1, wherein a dimension of the rubber mount along a vertical axis of the vehicle is at most 50.0 millimeters.

6. The vehicle according to claim 1, wherein a dimension of the rubber mount along a vertical axis of the vehicle is at most 28.5 millimeters.

7. The vehicle according to claim 1, wherein a dimension of the rubber mount along a vertical axis of the vehicle is at most 21.5 millimeters.

8. The vehicle according to claim 1, wherein a dimension of the rubber mount in a plane perpendicular to a vertical axis of the vehicle is at most 120 millimeters.

9. The vehicle according to claim 1, wherein a dimension of the rubber mount in a plane perpendicular to a vertical axis of the vehicle is at most 50 millimeters.

10. The vehicle according to claim 1, wherein a dimension of the rubber mount in a plane perpendicular to a vertical axis of the vehicle is at most 40 millimeters.

11. A vehicle, comprising:
a body;
a high-voltage accumulator which is attached to the body by way of fastening elements; and
at least one central connector which differs from the fastening elements and which, for supporting the body, is configured on the high-voltage accumulator,
wherein the central connector is a rubber mount having a vibration-absorbing rubber element which extends between the body and the high-voltage accumulator, wherein
the rubber element is enclosed by a threaded ring which engages with a compensation case.

12. The vehicle according to claim 11, wherein the rubber element has an internal-thread element into which a screw element for linking the body to the rubber mount is able to be screwed, and
the screw element engages through an opening of the compensation case.

13. The vehicle according to claim 12, wherein the opening has a circlip which bears on the screw element.

14. The vehicle according to claim 13, wherein the threaded ring and the internal-thread element have opposite rotating directions.

15. The vehicle according to claim 12, wherein the threaded ring and the internal-thread element have opposite rotating directions.

* * * * *